Jan. 7, 1941.   H. WOLLNER   2,227,687
BOOT STRUCTURE
Filed Dec. 4, 1939
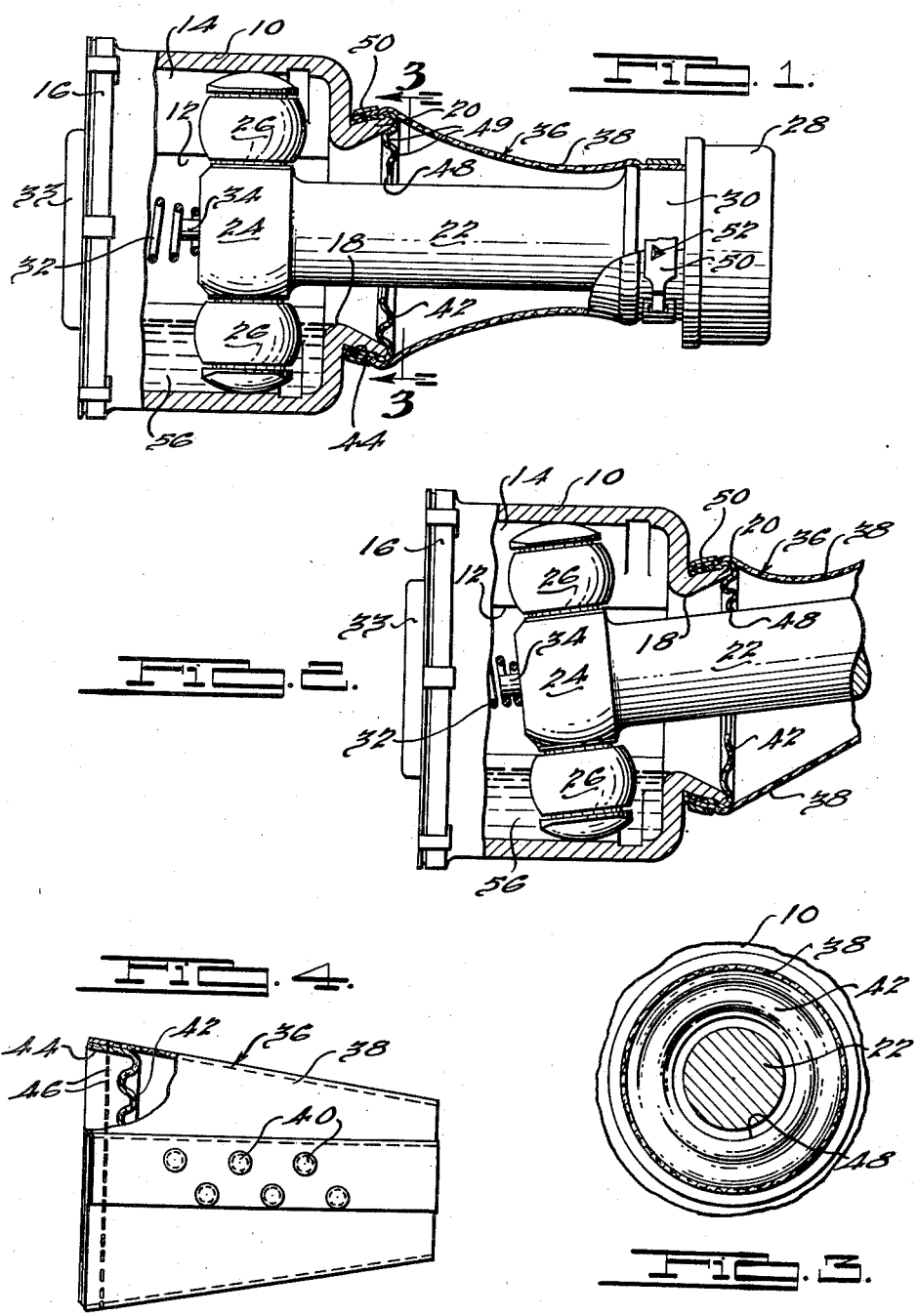
INVENTOR
Hans Wollner.
BY Harness, Dickey & Pierce.
ATTORNEYS.

Patented Jan. 7, 1941

2,227,687

UNITED STATES PATENT OFFICE 2,227,687

BOOT STRUCTURE

Hans Wollner, Detroit, Mich., assignor to Universal Products Company, Incorporated, Dearborn, Mich., a corporation of Delaware Application December 4, 1939, Serial No. 307,380

1 Claim. (Cl. 64—32)

This invention relates to universal joints and more particularly relates to improved boot constructions for universal joints.

One of the primary objects of the present invention is to provide an improved boot construction that will prevent the escape of lubricant from the joint housing and will also prevent entrance of foreign material, such as dust, dirt, and water, into the housing, without affecting the normal operation of the joint.

Another object of the invention is the provision of an improved dust seal, which is generally disc-shaped and which closes the opening into the joint housing and embraces the shaft which extends therethrough in such relationship that the lubricant within the housing cannot escape therefrom and yet the seal is provided with such fullness that the shaft may tilt with respect to the housing without destroying the seal.

Other objects of the invention will become apparent from the following specification, the drawing relating thereto, and from the claim hereinafter set forth.

In the drawing, in which like numerals are used to designate like parts in the several views throughout:

Figure 1 is a longitudinal, elevational view, with parts broken away, showing parts in cross-section of a universal joint construction having mounted thereon a boot constructed according to the present invention;

Fig. 2 is a partial view similar to Fig. 1, illustrating the shaft in a different position with respect to the housing from that shown in Fig. 1;

Fig. 3 is a cross-sectional view taken substantially along the line 3—3 of Fig. 1; and Fig. 4 is a longitudinal, elevational view, with a part broken away, showing parts in section of the boot illustrated in Fig. 1.

Referring to the drawing, a universal joint housing 10 is provided with a central, cylindrical bore 12 therein extending longitudinally thereof, and cylindrical guides 14 on opposite sides of the central bore, parallel thereto and opening thereinto throughout their length. A cover plate 16 closes one end of the housing normal to the axis of the longitudinal guide. An opening 18 is provided in the housing substantially at the center of the end opposite the plate 16 and has an outwardly diverging annular flange 20 around the periphery of the opening, through which a shaft member 22 projects.

The inner end of the shaft member 22 is within the housing and terminates in a ball head 24 which has clearance with the sides of the central bore 12. The ball head is drilled normal to the longitudinal axis of the shaft 22 and is provided with a pin press fitted therein, the opposite ends of which protrude from the ball head to provide trunnions upon which are journaled truncated bearing members or balls 26, which operatively engage the trunnions and are longitudinally slidable in the guide 14. The joint illustrated is of the type more fully shown in the Warner Patent No. 1,921,274.

The shaft 22 extends through the opening 18 and the opposite enlarged outer end 28 is adapted to telescope with a tubular drive shaft and be welded thereto. Between the outer end 28 and the smaller diametered main portion of the shaft 22, a recessed shoulder 30 is provided which extends around the periphery of the shaft member and forms a seat for one end of the boot, as will be described in further detail.

A helical spiral spring 32 has its large end seated within a recess 33 of the plate 16 and its smaller end engages the inner face of the end 24 of the shaft and is secured against lateral displacement relative to the shaft by means of a boss 34 which is loosely surrounded by the terminating coil of the spring.

In Fig. 1, the shaft member is illustrated in a slightly forward position axially of the housing, with the axis of the shaft in substantial alignment with the longitudinal axis of the housing. It is evident from the foregoing description that the joint housing and shaft member are universally and axially movable and in driving relation with respect to each other.

In order to prevent the escape of lubricant from the housing and to prevent foreign material from entering the housing, a unitary boot, generally indicated at 36, connecting the shaft and the housing and enclosing the housing opening, is provided. The boot 36 comprises an elongated, main outer boot portion 38, which is formed of a flexible leather sheet member, having its longitudinal edges overlapping throughout their length and secured together by means of rivets 40. The outer boot portion 38 is substantially frusto-conical in shape and has secured to its base edge an inner boot member 42.

Such inner boot member 42 is generally disc shaped and extends across the opening formed by the flange 20 radially disposed with respect to such opening. The member 42 has a reversely turned peripheral flange portion 44 which is secured to the body portion 38 either by stitching 46, or by cement, as desired.

The disc portion 42 is also formed of a flexible leather and is provided with a central opening 48 through which the shaft 22 is adapted to extend. The opening 48 is slightly larger than the diameter of the shaft 22 so that the boot may be assembled over the head 24, and the inner edge thereof extends into close proximity to the shaft.

In order to provide fullness in the member 42, so that the shaft may be tilted with respect to the housing, as indicated by a comparison of Figs. 1 and 2, the member 42 is preformed with a plurality of radially spaced, annular corrugations, indicated at 49.

Upon tilting of the shaft 22 out of its normal position in any direction, it will thus be seen that the fullness of the member 42 due to such corrugated form permits such movement without damage or permanent distortion in the disc member 42.

Also, according to the broader aspects of the present invention, in certain instances, the sealing member 42 may be used alone, rather than used with the outer boot member 38. It is, however, preferable to use the double boot construction including both the outer boot portion 38 and the inner boot portion 42.

In its assembled position, as shown in Fig. 1, the small end of the boot 38 is attached to the shaft member 22 on the shoulder 30 by means of a metal clamping strip 50, which extends around the engaging portion of the boot and is provided with cooperating tongue and slot connections at its ends to pull the strip tightly toward the shoulder 30 and hold the boot 38 in place. The strip 50 is provided with punched-in tabs 52 at spaced intervals around its periphery, which bite into the leather boot and prevent the marginal edge of the boot from slipping out from under the strip 50 when subjected to strain.

The boot 36 is in surrounding relation to the shaft member 22 extending longitudinally thereof, and has the large end of the outer boot member 38 telescoped over the flange 20. The marginal edge of the reversely bent, annular portion 44 of the boot member 42 fits within the marginal edge of the outer boot 38, as described above; and both are clamped to the flange 20 by means of a metal strip 50 similar to the one described above.

The interior of the housing 10 is charged with a lubricant 56, and it will be evident that the boot member 42 prevents the escape of such lubricant along the shaft and prevents such lubricant from getting within the outer boot portion 38.

Formal changes may be made in the specific embodiment of the invention described without departing from the spirit and substance of the invention, the scope of which is commensurate with the appended claim.

What is claimed is:

As an article of manufacture, a non-metallic boot for a universal joint comprising an elongated, substantially frusto-conical flexible body member, and a generally disc shaped member engaging the base of said body member, said disc shaped member having a central opening therethrough and extending radially of the longitudinal axis of said body portion, said disc shaped member being provided with a plurality of radially spaced, annular corrugations therein.

HANS WOLLNER.